(12) United States Patent
Gorman et al.

(10) Patent No.: US 7,413,779 B2
(45) Date of Patent: Aug. 19, 2008

(54) TIRE FABRIC TREATING UNIT

(75) Inventors: John Francis Gorman, Whitesboro, NY (US); Gerald John Hebert, Utica, NY (US); Howard William Wood, New Hartford, NY (US)

(73) Assignee: Hyosung USA, Inc., Decatur, AL (US)

( * ) Notice: Subject to any disclaimer, the term of this patent is extended or adjusted under 35 U.S.C. 154(b) by 689 days.

(21) Appl. No.: 10/925,653

(22) Filed: Aug. 25, 2004

(65) Prior Publication Data

US 2006/0045983 A1  Mar. 2, 2006

(51) Int. Cl.
*B05D 3/02* (2006.01)
(52) U.S. Cl. .................... 427/389.9; 427/394
(58) Field of Classification Search .............. 427/389.9, 427/394
See application file for complete search history.

(56) References Cited

U.S. PATENT DOCUMENTS

| | | | |
|---|---|---|---|
| 2,769,222 A | 11/1956 | Southwell | 28/73 |
| 3,284,922 A | 11/1966 | Goldenberg et al. | 34/156 |
| 3,961,651 A | 6/1976 | Balentine, Jr. | 139/291 |
| 4,783,908 A | 11/1988 | Pabst | 34/4 |
| 5,065,796 A * | 11/1991 | Roach et al. | 139/300 |
| 5,102,724 A | 4/1992 | Okawahara et al. | 428/224 |
| 5,635,270 A | 6/1997 | Fletcher | 428/81 |
| 5,837,622 A | 11/1998 | Hamilton et al. | 442/184 |
| 5,849,121 A | 12/1998 | Reuter | 152/527 |
| 5,858,885 A | 1/1999 | Hamilton et al. | 442/184 |

FOREIGN PATENT DOCUMENTS

| | | |
|---|---|---|
| GB | 908 627 A | 10/1962 |
| JP | 57 072812 A | 5/1982 |
| JP | 2002 069776 A | 3/2002 |

* cited by examiner

*Primary Examiner*—Erma Cameron
(74) *Attorney, Agent, or Firm*—Phillips Lytle LLP

(57) ABSTRACT

A process and a manufacturing system for producing an adhesive coated fabric. The manufacturing system has a weaving loom, a dip unit, and a curing unit; the three units being in-line and the fabric passing successively from one unit to the next unit. The curing unit has a plurality of electric heating means. The controls of the weaving loom and the curing unit are linked so that the heating means in the cure unit are turned off when the weaving loom is shut down.

1 Claim, 3 Drawing Sheets

TIRE FABRIC TREATING UNIT

FIELD OF THE INVENTION

The present invention is directed to a treating unit for tire fabric. More specifically, disclosed is an inline treating unit wherein cord is received at the input end of the unit and finished treated tire fabric is the output of the unit. The cord may be twisted, woven, treated, and heated during the process.

BACKGROUND OF THE INVENTION

Tires are composed of three primary materials: rubber, fabric, and steel. The fabric used in the tire is employed as rubberized fabric in many elements of the tire, such the carcass plies, belt plies, or bead area reinforcing plies. The rubberized fabric is supplied in calendered rolls to the tire building machine. Fabric materials used in the tire range from rayon, nylon, polyester, aramid, and other types of synthetic fibers and blends of such materials.

Conventionally, the fabric to be incorporated into a tire is received from the yarn manufacturer in spools of treated or untreated yarn. The yarn may already be formed into a cord, and for the discussion herein, the terms will be considered interchangeable. Even if the received yarn is pretreated, the yarn may still be subject to further treatment by the tire manufacturer to impart desired yarn characteristics. The received yarn is either stored or sent to a separate weaving loom to transform the yarn into fabric. Eventually, the yarn is formed into a fabric via a weaving operation and then the fabric is treated in the dip units.

During adhesive treatment of the material, the material is exposed to a steady state of heat for a specific amount of time to impart the desired properties to the yarn. The treatment processing lines are run at a consistent speed and at a certain temperature to insure that the amount of energy imparted into the yarn is consistent throughout the treatment process. During weaving, a weaving machine is frequently stopped and restarted due to yarn refilling and yarn breakage. Thus, because of multiple interruptions in the process, a weaving line is conventionally separate from the yarn treatment line where the heat history of the yarn must be controlled to achieve the desired yarn, and ultimate fabric, properties.

SUMMARY OF THE INVENTION

The present invention is directed to a process line wherein the cord is both woven and treated in an inline process and the heat history of the yarn is controllable to achieve a fabric with the desired heat history and physical properties. The preferred disclosed process also results in a shorter, and more controlled, heat process time for the yarn, and results in reduced energy input thereby reducing manufacturing time and costs.

Definitions

The following definitions are controlling for the disclosed invention.

"Cord" means a plurality of reinforcement strands of grouped yarns of a material. Cords occurs in the following forms: 1) a number of fibers twisted together; 2) a number of filaments laid together without twist; 3) a number of filaments laid together with a degree of twist; or 4) a single filament with or without twist (monofilament).

"Fabric" denotes a woven network of essentially unidirectionally extending cords, such cords being warp cords, connected by a series of weft cords extending at an angle to the warp cords. The fabric is woven and flexible.

"Yarn" means a continuous strand of textile fibers or filaments.

BRIEF DESCRIPTION OF THE DRAWINGS

The invention will be described by way of example and with reference to the accompanying drawings in which.

DETAILED DESCRIPTION OF THE INVENTION

Figure 1:
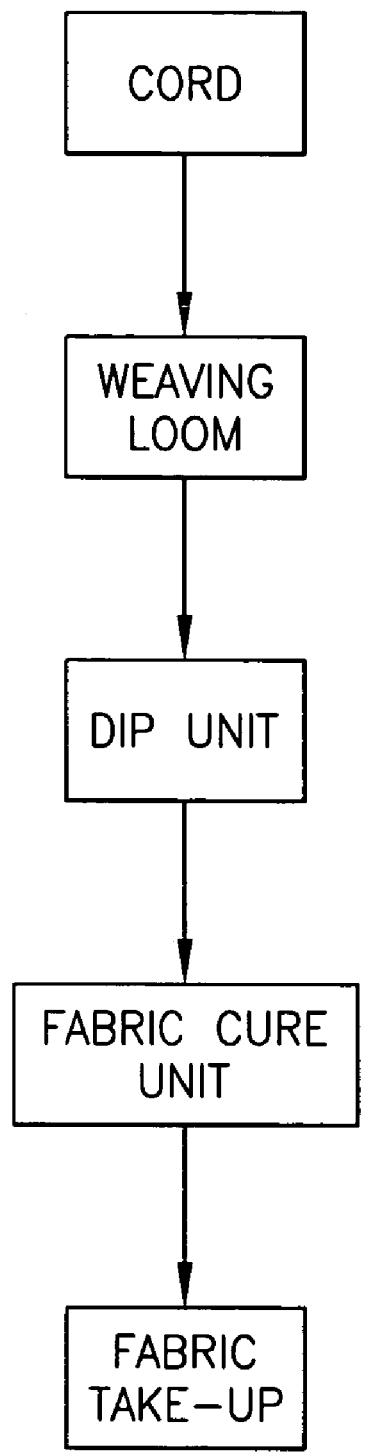
FIG. 1 is a flow diagram of a fabric forming and curing process.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 is a flow chart of the process of the present invention. Cord or yarn is received from the manufacturer. If further plying of the cord or yarn is required, than such operations are performed. Within the context of the disclosed invention, the terms yarn and cord are used interchangeably to indicate the material being used to form a fabric. The specific type of material may be any conventional or new type of tire reinforcing material of the type that is typically defined as having a denier; such materials include, but are not limited to, rayon, nylon, polyester, aramid, other types of synthetic fibers, or blends thereof.

After the yarn is in the desired form, i.e. desired twist and denier values, the yarn is sent to a weaving loom and woven into the desired fabric form. Yarns of different deniers and materials may be used for both the warp and weft threads of the fabric. When manufacturing tire fabric for a tire ply, the warp yarns become the primary reinforcing means in the ply and the weft yarns are present merely to maintain a desired spacing and orientation of the warp yarns. Thus, the weft yarns are typically of a much lighter denier than the warp yarns. For typical tire manufacturing, except for chafer fabrics, the weft yarn is a purchased spun yarn such as rayon, cotton, or polycotton blends. The specific weave pattern will be dependent upon the end use of the fabric in the tire.

Following weaving into a fabric defined by warp and weft yarns, the fabric is treated in a dip unit. As the fabric passes through the dip unit, an adhesive coating is applied to the fabric. The particular adhesive used is dependent upon the type of yarn forming the fabric. Conventional adhesives include an RFL (resorcinol formaldehyde latex) adhesive. After passing through the dip unit, the fabric enters into a curing unit. In the cure unit, excess moisture is removed from the coated fabric and the particular adhesive is cured. Curing is accomplished by heating the fabric, forcing the moisture out of the fabric and bringing the adhesive to cure temperature.

After the fabric has been cured, the fabric is wound onto take up rolls and either sent to storage or to a separate calendar operation to apply rubber to the fabric. For tire manufacturing, the calendar operation is usually completed at the tire plant. While reference is made specifically to using the fabric for tires, the fabric may be employed in other known cord reinforced articles of manufacture such as hoses, power transmission belts, conveyor belts, or air spring sleeves.

Figure 2:
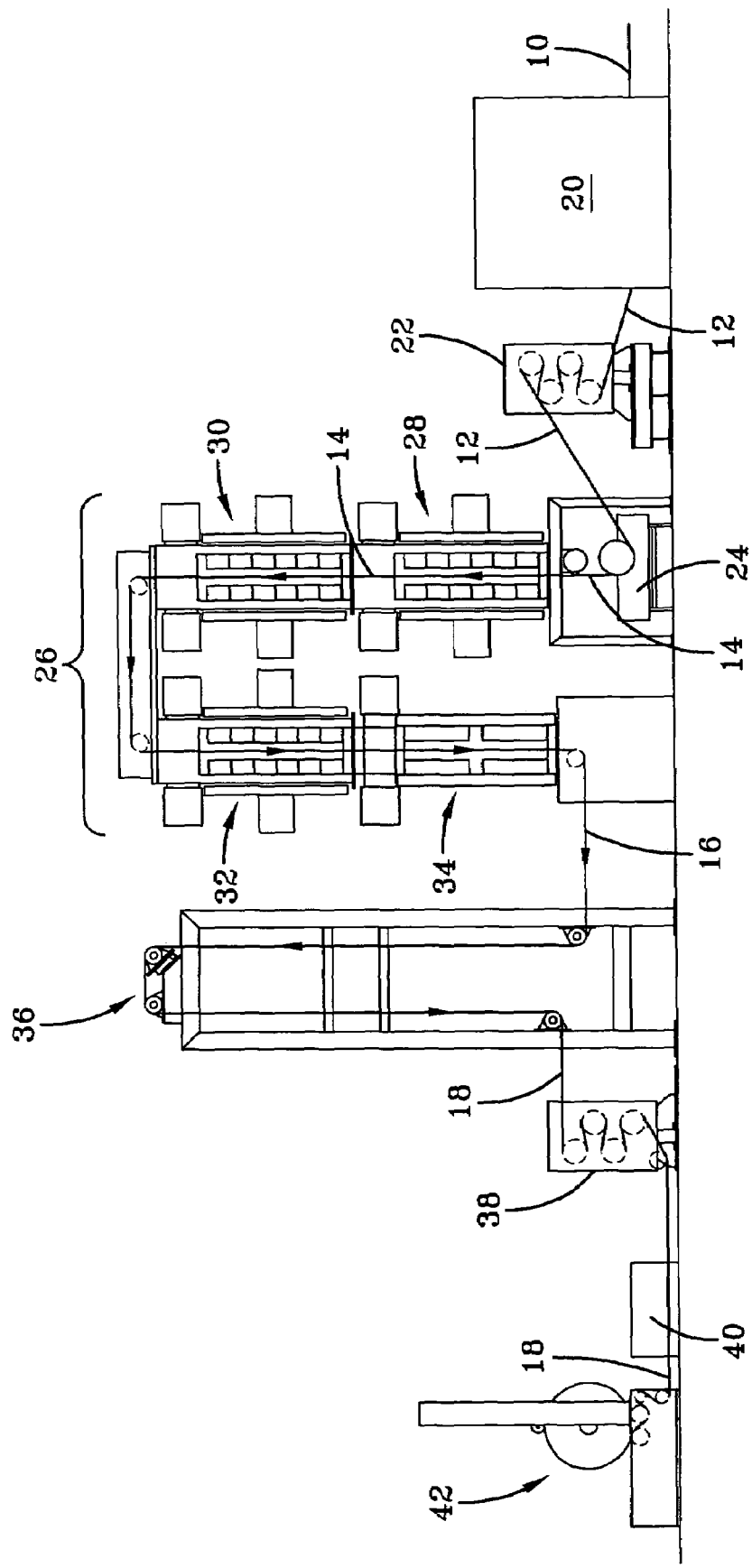
FIG. 2 illustrates a fabric process line.

FIG. 2 illustrates a process based on the flow diagram of FIG. 1. Cord 10 is presented to the weaving loom 20. The weaving loom 20 is shown in "black box" format, as the exact type of weaving loom is irrelevant to the present invention. After the fabric 12 is woven, the fabric 12 passes through an optional tension stand 22. The tension being applied to the fabric 12 is generally sufficient to prevent the fabric 12 from slipping as it travels between the weaving loom 20 and the tension stand 22, but not enough to stretch the fabric 12.

The fabric 12 then travels into the dip unit 24. The illustrated unit 24 is a full immersion unit that permits liquid adhesive to coat both sides of the fabric 12. Alternatively, the dip unit 24 may be a spray unit wherein sprayers apply the adhesive to both sides of the fabric 12. The particular adhesive application unit being employed may be dependent upon a variety of factors such as the fabric dimensions, the amount of adhesive that must be applied, or the type of adhesive being used.

After passing through the dip unit 24, the coated fabric 14 travels through a fabric cure unit 26. The fabric cure unit 26 has a series of heating stages 28, 30, 32, 34. The number of illustrated heating stages is shown as four; however, that number may be increased or decreased and is merely illustrative. In the first stages 28, 30, 32 of the cure unit 26, the primary activity is drying of the adhesive. This is accomplished by providing heat to the fabric 14 and providing air to remove the evaporated adhesive base. Heat is supplied by specific heating means and simultaneously air is supplied to and exhausted from the heating stage 28, 30, 32. The air being supplied to the heating stage 28, 30, 32 absorbs the evaporated adhesive base and is exhausted from the heating stage 28, 30, 32, thus a constant flow of air passes through the heating stage. The fabric temperature in the first stages ranges from 150° to 300° F.

In the last stage 34 of the cure unit 26, curing of the active adhesive occurs. Similar to the drying of the fabric occurring in multiple stages, curing of the fabric 14 may also occur in multiple stages; more than the illustrated single stage 34. The fabric temperature in this stage 34 ranges from 400° to 525° F., the exact temperature being dependent upon the type of adhesive system being used and the necessary temperature required to cure the adhesive. Heat is supplied by the specific heating means and air is only exhausted from this curing stage 34.

Exiting the cure unit 26, the cured fabric 16 is at an elevated temperature and is passed into a cooling tower 36. In the cooling tower 36, the cured fabric 16 travels through a path of sufficient length to permit it to reach a temperature of no more than 30° greater than room temperature. If the exiting fabric 18 is too warm, the fabric 18 will stick to itself and adjacent layers in the fabric windup stand 42. Preferably, the exiting fabric 18 is at room temperature. To achieve such cooling, the cooling tower 36 may have multiple vertical passes. Some conventional fabric cooling towers have a height in excess of forty feet, or several building floors high.

Upon exiting the cooling tower 36, the fabric 18 passes through a tension stand 38. In this tension stand 38, the tension load is increased in comparison to the prior tension stand 22. The increased tension is used to stabilize the properties of the fabric 18 to enhance its performance when the fabric 18 is a component in a rubber reinforced product. As the fabric 18 passes between the tension stands 22, 38, the woven fabric is subject to tensions ranging from 500 to 5000 lbs.

The treated fabric 18 then passes through an optional edge spreader 40 to control the desired width and prevent any folding or creasing of the fabric 18 as it is wound onto the take up roll. The completed fabric 18 is then sent to a calendar to be transformed into a rubberized fabric or sent to storage until needed.

Figure 3:
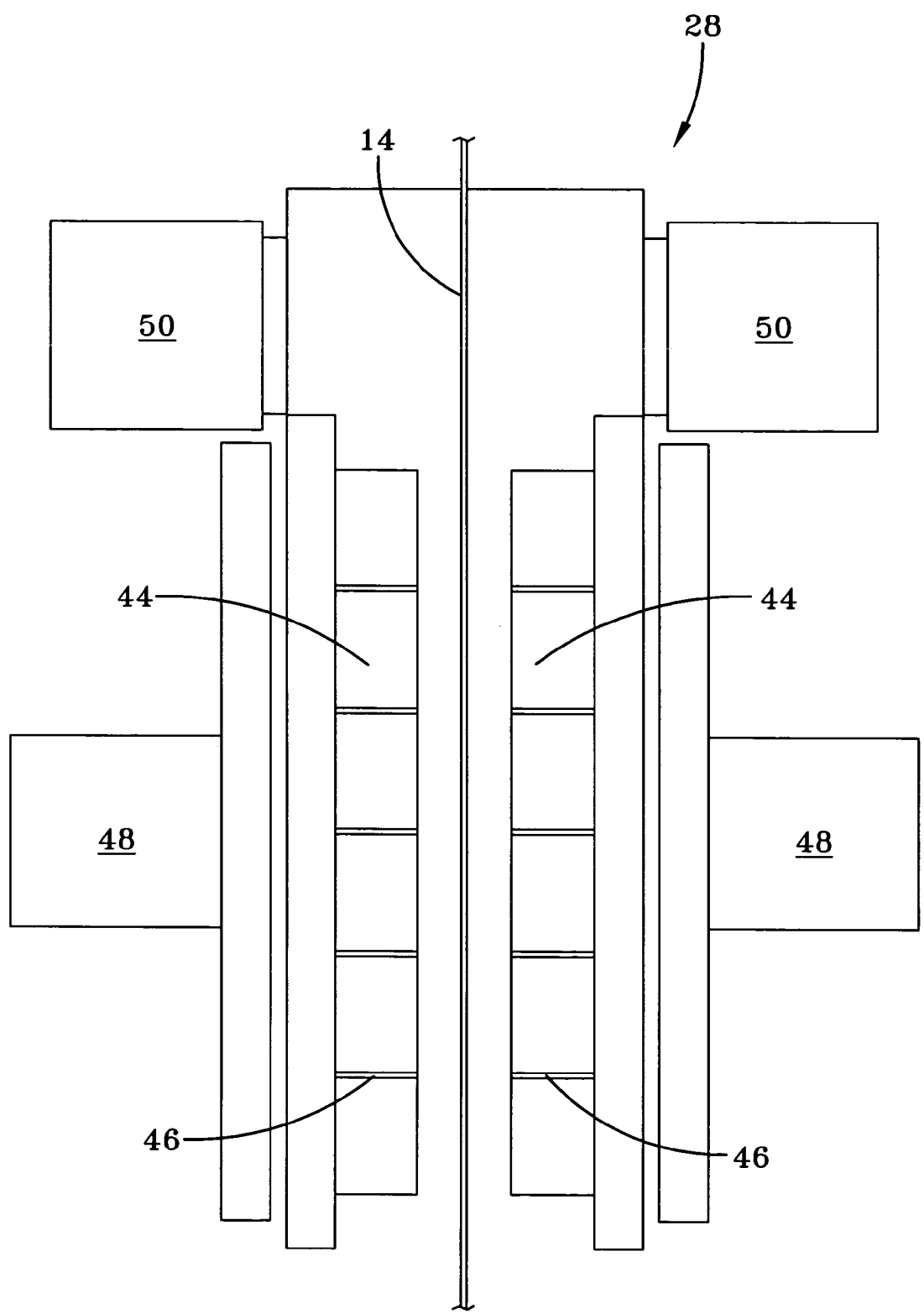
FIG. 3 is a curing stage in accordance with the present invention.

FIG. 3 illustrates one drying stage of the cure unit 26. The illustrated stage 28 has at least a pair of heaters 44 opposingly mounted on frames. The coated woven fabric 14 passes between the opposed heaters 44. In the first stages of the curing unit, i.e. the drying stages, the primary goal of the heaters 44 is to evaporate the adhesive base, typically water. To enable evaporation, the heaters 44 raise the temperature of the coated woven fabric 14 to a temperature greater than the evaporation point of the adhesive base. The evaporated adhesive base is absorbed by air flowing through air ports 46 between the heaters. Air is supplied by an air input means 48, one such unit 48 located with each set of heaters 44. The saturated air is removed by air exhaust means 50 located at the top of each cure unit.

Fabric temperatures during drying range from 150° to 300° F. If the coated woven fabric 14 is to pass through multiple drying stages, than the temperature of the coated woven fabric 14 may increases as it passes through successive stages. Alternatively, the same temperature may be sought in all of the drying stages to enable a more rapid drying of the coated woven fabric 14.

As the fabric 14 passes successively through each stage, the adhesive base is evaporated and during the final stages of the unit 26, the coated woven fabric 14 is heated to a temperature sufficient to cure the adhesive. Such temperatures range from 400° to 525° F., the actual temperature being dependent upon the cure temperature of actual adhesive being used. For example, typical polyester adhesives have a cure temperature of approximately 470° F. (245° C.) and conventional commercial nylon adhesive have a typical cure temperature of about 450° F. (232° C.).

As previously discussed, adhesive treatment of material, either a cord or a fabric, and weaving of cord into a fabric are conventionally incompatible operations due to the need to run the adhesive treatment at a consistent speed to obtain a known heat history in the cord. Heating systems for a cure unit employ a variety of heating sources, such as coal, steam, and gas, and all such conventional systems, with the exception of gas, use heat exchangers to provide heated air to the material being processed. For gas units, the units are direct-fired heated air, and do not require the use of heat exchangers. Thus, conventional heating ovens use conduction heating means wherein the transfer of energy occurs from one molecule to adjacent molecules without the substance moving as whole, to raise the temperature in the heating ovens. The use of heated air requires a great deal of thermal inertia to maintain the required temperatures. If the passage of the material is interrupted in the cure unit, due to the inability to rapidly change the temperature in the cure unit even when the heating unit was shut down, the material will sit and cook in the unit, resulting in waste fabric.

To overcome these conventional limitations, in the present invention, heat is applied in the cure unit 26 by means of electronic heating systems. Examples of such heating systems include infrared heating systems, induction heating units and microwave heating systems. For the different heating systems, the adhesive coating for fabric may have to be modified.

By the use of electronic heating systems, when the units are turned off, heating of the coated woven fabric 14 is immediately halted. The air surrounding and passing through the curing stages 28, 30, 32, 34 is almost immediately restored to an ambient room temperature, and the coated woven fabric 14 immediately begins to cool down towards an ambient room temperature. Within seconds, the high energy is removed and the fabric 14 is cooled below the point at which the heat history is affected. The fabric 14 obtains an ambient temperature within no more than twenty seconds, preferably, no more than five seconds, of the heating units 44 being turn off. This ensures the fabric will not be overexposed to heat, thereby altering the fabric beyond the useful range. In a conventional conduction, the air surrounding the ovens remains heated and the coated woven fabric does not immediately begin to cool and the heat history in the fabric continues to build.

Conversely, when the heating units 44 of the curing stages 28, 30, 32, 34 are turned on, with the energy and air flow restored to the heating units 44, the fabric temperature is quickly restored to operating temperatures, allowing the coated woven fabric 14 to begin traveling through the curing unit, reducing down time of the entire process. With a conventional heating unit, at a restart of the process, because of the lengthy time needed to reach operating temperatures in the ovens, the entire process cannot be almost immediately restarted.

Both the weaving loom 20 and the ovens 44 in the cure unit 26 are provided with controls for stopping and starting the operation of the loom 20 and the ovens 44. To achieve one of the objectives of the present invention, to prevent heat history buildup in the fabric and adhesive, the controls of the loom 20 and the controls of the ovens 44 are connected. When the loom 20 is shut down due to issues such as a cord change over or a break in the weave, the connected controls shut down the ovens 44 in the cure unit 26. Conversely, when the loom 20 is restarted, the ovens 44 are automatically turned back on. When fully operational, the line speed of the process is in the range of 3 to 15 yards/min.

The goal of the present invention is to provide a fully integrated weaving and cure process for converting cord into a fully treated fabric wherein examination of the fabric shows no heat buildup in any sections of the fabric length, regardless of whether or not the entire process had to be shutdown at any point in the production process.

While the present invention is shown in the context of the fabric first being prepared and then adhesively coated, if desired, this order may be reversed and the cords may be treated prior to forming of a fabric. The fabric forming unit and the ovens in the cure unit would still be connected in the manner described above to prevent any heat history buildup in the material being treated.

Additionally, the present invention specifically references forming a woven fabric of warp and weft yarns; however, the present invention is also applicable to the formation of a knit fabric. Instead of the cords being presented to a weaving loom, the cords would be presented to a knitting machine to form a knitted fabric. Also, non-woven, non-knitted fabric, i.e. a mat of bound fibers, needled or non-needled, may also be formed in the present system and treated as described herein.

What is claimed is:

1. A method of preparing an adhesive coated tire fabric, the method comprising the following steps:
    a) receiving cords from a cord let-off;
    b) forming a tire fabric from the received cords;
    c) passing the tire fabric through an adhesive application unit to coat the tire fabric with adhesive; and
    d) passing the coated fabric through a curing unit, heating the adhesive and curing the adhesive on the coated fabric, the curing unit having heating means to heat and cure;
    wherein the heating means elevate the temperature of the coated fabric to a temperature in the range of 150° to 525° F.;
    wherein when the fabric-forming step is halted, the heating means are automatically turned off; and
    wherein, within not more than twenty seconds after the heating means are turned off, the temperature of the coated fabric decreases.

* * * * *